US010028001B2

(12) United States Patent
Drake et al.

(10) Patent No.: US 10,028,001 B2
(45) Date of Patent: Jul. 17, 2018

(54) SYSTEMS AND METHODS FOR PROVIDING ACCESS TO MEDIA CONTENTS USING A RIGHTS DATABASE

(71) Applicant: Disney Enterprises, Inc., Burbank, CA (US)

(72) Inventors: Edward C. Drake, Stevenson Ranch, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 176 days.

(21) Appl. No.: 15/290,934

(22) Filed: Oct. 11, 2016

(65) Prior Publication Data

US 2018/0103281 A1 Apr. 12, 2018

(51) Int. Cl.

*H04L 29/06* (2006.01)
*H04N 21/254* (2011.01)
*H04L 29/08* (2006.01)
*H04N 21/4627* (2011.01)

(52) U.S. Cl.

CPC ....... *H04N 21/2541* (2013.01); *H04L 67/306* (2013.01); *H04N 21/4627* (2013.01)

(58) Field of Classification Search

CPC ........... H04N 21/2541; H04N 21/4627; H04N 67/306

See application file for complete search history.

(56) References Cited

U.S. PATENT DOCUMENTS 8,452,016 B2 5/2013 Robert
9,548,859 B2 * 1/2017 Medvinsky ............. G06F 21/10
2004/0181667 A1 * 9/2004 Venters, III ............. G06F 21/10 713/164
2007/0265975 A1 * 11/2007 Farrugia ................. G06F 21/10 705/59
2012/0060031 A1 * 3/2012 Huang .................... H04L 9/083 713/168
2013/0111517 A1 * 5/2013 Dillon ..................... G06F 21/10 725/25
2014/0331252 A1 * 11/2014 Jin ..................... H04N 21/2541 725/29
2015/0261939 A1 * 9/2015 Arana ..................... G06F 21/10 726/26
2017/0149835 A1 * 5/2017 Mitevski ................. H04L 63/10
2017/0171626 A1 * 6/2017 Eatedali ............. H04N 21/4788
2017/0316185 A1 * 11/2017 Park ........................ H04L 9/088

* cited by examiner

*Primary Examiner* — Chau Le

(74) *Attorney, Agent, or Firm* — Farjami & Farjami LLP

(57) ABSTRACT

There is provided a system comprising a non-transitory memory storing a rights database and a hardware processor configured to receive a user input from a user device requesting playback of a media content, the media content being provided by a first type of content provider, perform a first search of the rights database for a first media content entitlement associated with the media content corresponding to the first type of content provider, if the first search does not find the first media content entitlement, perform a second search of the rights database for a second media content entitlement associated with the media content corresponding to a second type of content provider, and, when the second search finds the second media content entitlement, enable playback of the media content from a content provider that is the first type of content provider based on the second media content entitlement corresponding to the second type of content provider.

20 Claims, 4 Drawing Sheets

SYSTEMS AND METHODS FOR PROVIDING ACCESS TO MEDIA CONTENTS USING A RIGHTS DATABASE

BACKGROUND

Nowadays, rather than purchasing physical media, consumers increasingly access media contents directly from content providers, such as a cable provider or an online provider, including subscription-based content providers and transactional content providers. Conventionally, subscription-based content providers allow users to access a predetermined library of content during a limited availability window, and transactional content providers allow users to access purchased media contents.

SUMMARY

The present disclosure is directed to systems and methods for providing access to media contents using a rights database, substantially as shown in and/or described in connection with at least one of the figures, as set forth more completely in the claims.

DETAILED DESCRIPTION

Figure 1:
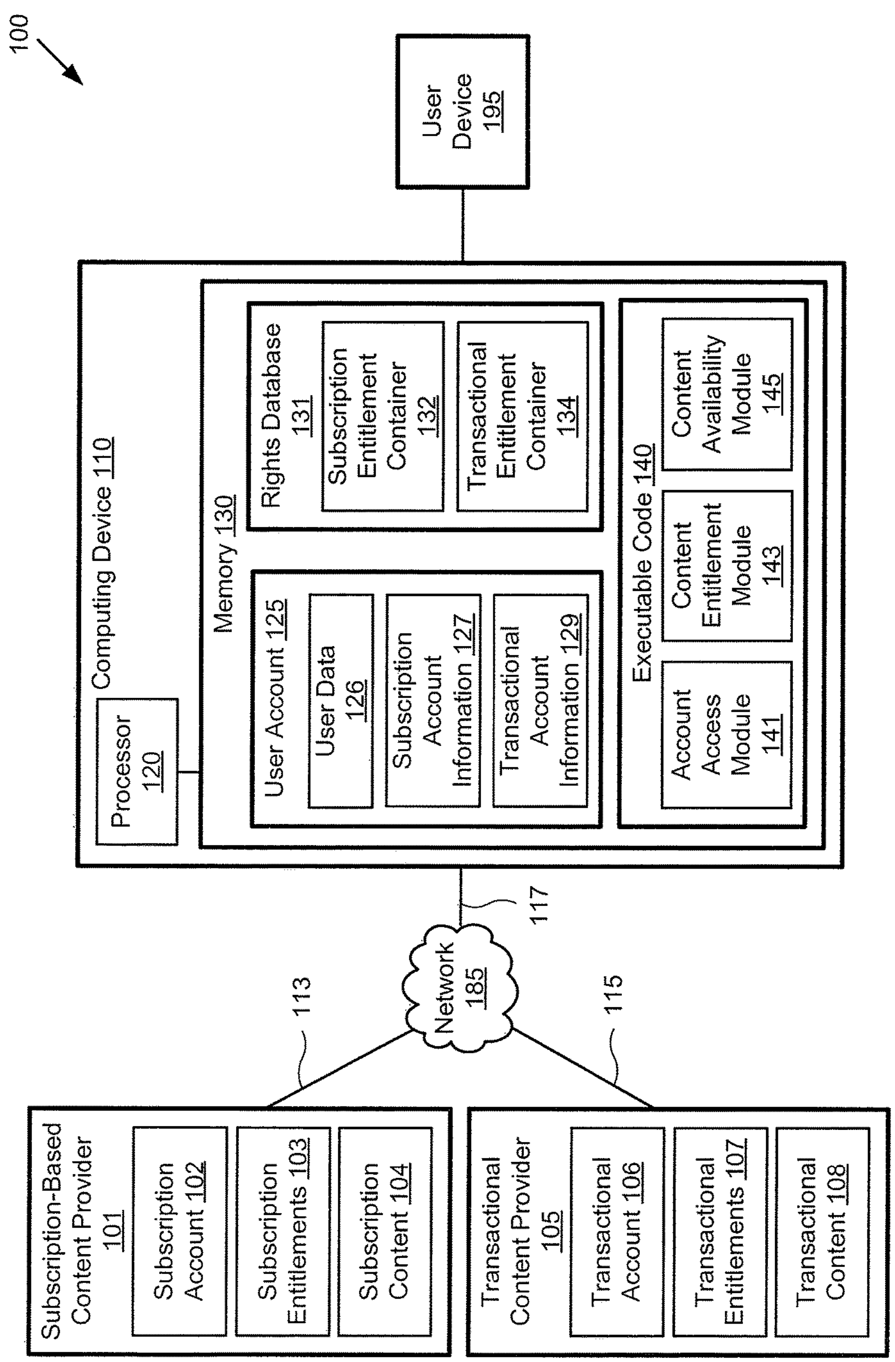
FIG. 1 shows a diagram of an exemplary system for providing access to media contents using a rights database, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for providing access to media contents using a rights database, according to one implementation of the present disclosure. Diagram 100 includes subscription-based content provider 101, transactional content provider 105, network 185, and computing device 110. As shown in FIG. 1, subscription-based content provider 101 is connected to network 185 via connection 113, transactional content provider 105 is connected to network 185 via connection 115, and computing device 110 is connected to network 185 via connection 117. Network 185 may be a computer network, such as the Internet. Subscription-based content provider 101 includes subscription account 102, subscription entitlements 103, and subscription content 104. In some implementations, subscription-based content provider 101 may be a cable content provider, a subscription video on demand (SVOD) provider, such as an online content provider, such as a video streaming service, e.g., Netflix, Amazon Prime Video, Hulu, etc., or other content provider that provides access to subscription content 104. In one implementation, subscription-based content provider 101 may be an on-demand content provider, such as a subscription video on demand (SVOD) content provider. In other implementations, subscription-based content provider 101 may provide video media contents, such as movies, television shows, computer games, and/or audio media contents, such as music, audio books, electronic books, etc.

Subscription account 102 may include a user's subscription account login information, personal information about a user, such as first and last name of the user, a username to sign in to subscription account 102, contact information of the user, payment information for subscription account 102, a start date of the subscription, a term of the subscription and/or an expiration date of the subscription, etc. In some implementations, subscription account 102 may include one or more account profiles associated with a corresponding one or more users of subscription account 102, such as a profile for each parent in a household and a profile for each of one or more children in the household. Various profiles associated with subscription account 102 may have different permissions and/or restrictions associated therewith. For example, a profile associated with a child may have viewing restrictions, such as content rating restrictions, time-of-day viewing restrictions, etc.

Subscription entitlements 103 may include permissions allowing a user to access subscription content 104. In one implementation, subscription entitlements 103 may include a database of media contents for which access is allowed, such as a database including a plurality of media contents that are currently available through subscription-based content provider 101. Subscription entitlements 103 may include an availability window for each media content in the database. For example, subscription entitlements 103 may include an availability window start date on which user access to subscription content 104 may begin, a duration of the availability window for each media content in the database, and/or an availability window end date past which access to subscription content 104 may not be allowed.

Transactional content provider 105 includes transactional account 106, transactional entitlements 107, and transactional content 108. In one implementation, transactional content provider 105 may be an on-demand content provider, such as a transactional video on-demand (TVOD) content provider. In other implementations, transactional content provider 105 may provide media contents, such as movies, television shows, computer games, music, audio books, electronic books, etc. Transactional content provider 105 may be a TVOD provider, such as a cable content provider, e.g., HBO, an online content provider, such as a transactional streaming service that allows a user to rent or purchase a media content, e.g., iTunes, Amazon Instant Video, etc., or other content provider that provides access to transactional content 108.

Transactional account 106 may include a user's transactional account login information, personal information about the user, such as first and last name of the user, a username to sign in to the user's transactional account, contact information of the user, payment information for the user's transactional account, etc. In some implementations, transactional account 106 may include one or more account profiles associated with a corresponding one or more users of transactional account 106, such as a profile for each parent in a household and a profile for each of one or more children in the household. Various profiles associated with the transactional account may have different permissions and/or restrictions associated therewith. For example, a profile associated with a child may have viewing restrictions, such as content rating restrictions, time-of-day viewing restrictions, etc.

Transactional entitlements 107 may include permissions allowing a user to access transactional content 108. In one implementation, transactional entitlements 107 may include a database of media contents for which access is allowed, such as a database including a plurality of media contents that a user has rented or purchased.

Computing device 110 may be a server for providing access to subscription-based media content through a transactional media provider. Computing device 110 includes processor 120 and memory 130. Processor 120 is a hardware processor, such as a central processing unit (CPU), found in computing devices. Memory 130 is a non-transitory storage device for storing computer code for execution by processor 120, and also for storing various data and parameters. As shown in FIG. 1, memory 130 includes user account 125, rights database 131 and executable code 140. User account 125 may be an account associated with user login identification, such as a username, a password, etc. In one implementation, user account 125 may include user data 126. User data 126 may include information about a user, such as age, gender, location, e.g., home address, preferences, e.g., favorite movies, favorite television shows, favorite music, preferred genres, etc. In one implementation, user account 125 may store account information for various accounts associated with the user, such as subscription account information 127, transactional account information 129, etc., allowing a user to login to user account 125 and access media contents, such as subscription content 104 and/or transactional content 108, without the user having to separately log in to an account with subscription-based content provider 101 and/or an account with transactional content provider 105.

Rights database 131 may be a database for storing rights associated with media contents, such as rights to subscription content 104 and/or rights to transactional content 108. Rights database 131 includes subscription entitlement container 132 and transactional entitlement container 134. In some implementations, subscription entitlement container 132 may store rights to one or more media contents, such as subscription content 104 via subscription-based content provider 101. In one implementation, subscription entitlement container 132 may include availability window information corresponding to each right stored therein. Transactional entitlement container 134 may store rights to one or more media contents, such as transactional content 108 via transactional content provider 105.

Executable code 140 may contain one or more executable modules for execution by processor 120. As shown in FIG. 1, executable code 140 includes account access module 141, content entitlement module 143, and content availability module 145. Account access module 141 is a software module stored in memory 130 for execution by processor 120 to access subscription account 102 and transactional account 106. In some implementations, when the user signs in to user account 125, account access module 141 may use subscription account information 127 to sign in to subscription account 102, and/or account access module 141 may use transactional account information 129 to sign in to transactional account 106. In one implementation, a user using user device 195 may access subscription content 104 and/or transactional content 108 via user account 125.

Content entitlement module 143 is a software module stored in memory 130 for execution by processor 120 to verify that rights database 131 includes an entitlement for a media content. For example, if a user accesses transactional content 108 through account 125, the user may choose to watch transactional content 108. Content entitlement module 143 may check transactional entitlement container 134 for a transactional entitlement corresponding to transactional content 108. If transactional entitlement container 134 does not include a transactional entitlement for transactional content 108, content entitlement module 143 may search subscription entitlement container 132 for a subscription entitlement to transactional content 108. In one implementation, content entitlement module 143 may search a list of media contents including a plurality of media contents that are currently provided through subscription-based content provider 101 stored in subscription entitlement container 132.

Content availability module 145 is a software module stored in memory 130 for execution by processor 120 to verify the availability of a media content from a content provider. For example, when executable code 140 receives a request for playback of a media content, content availability module 145 may verify that the media content is included in subscription content 104, transactional content 108, both subscription content 104 and transactional content 108, etc. In some implementations, content availability module 145 may transmit an authentication request to subscription content 104 and/or transactional content 108 to verify that a requested media content is currently available. Content availability module 145 may receive an authentication response authenticating the availability of a requested media content. In some implementations, content availability module 145 may verify with subscription-based content provider 101 that a requested media content is currently within an availability window. In some implementations, content availability module 145 may verify that a requested media content is available from transactional content provider 105.

In other implementations, subscription content provider 101 and/or transactional content provider 105 may provide push notifications for the availability of subscription content 104 and transactional content 108, respectively. Subscription-based content provider 101 may also push subscription entitlements 103 to rights database 131. Transactional content provider 105 may push transactional entitlements 107 to rights database 131. Accordingly, content availability module 145 may verify the availability of a requested media content based on availability window information stored in rights locker 131.

User device 195 may be a smart television, a computer, a tablet computer, a mobile device, or other device suitable for watching media contents. In one implementation, a user may log in to user account 125 using user device 195. Once logged in to user account 125, the user may access subscription content 104 and/or transactional content 108 via executable code 140.

Figure 2:
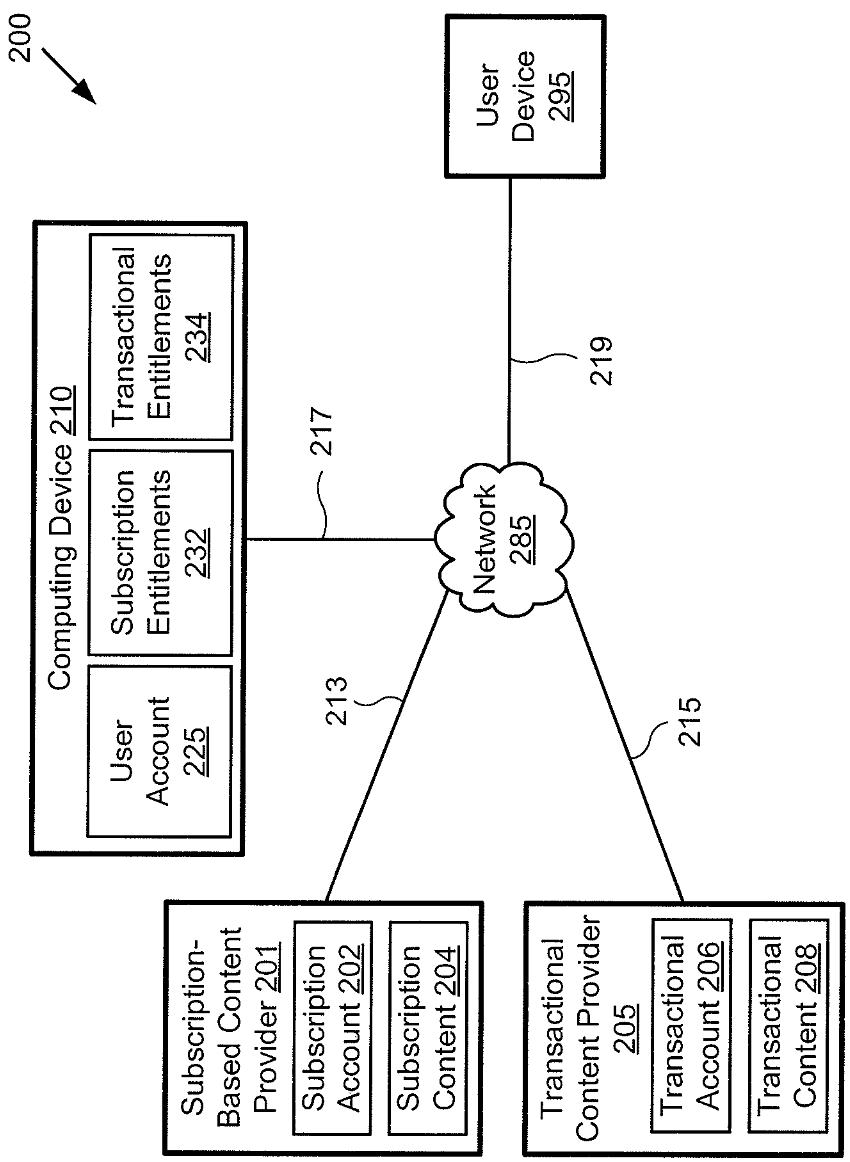
FIG. 2 shows a diagram of another exemplary system for providing access to media contents using a rights database, according to one implementation of the present disclosure.

FIG. 2 shows a diagram of another exemplary system for providing access to media contents using a rights database, according to one implementation of the present disclosure. Diagram 200 includes subscription content provider 201, transactional content provider 205, computing device 210, network 285, and user device 295. Network 285 may be a computer network, such as the Internet. In some implementations, subscription content provider 201 may be connected to network 285 via connection 213, transactional content provider 205 may be connected to network 285 via connection 215, computing device 210 may be connected to network 285 via connection 217, and user device 295 may be connected to network 285 via connection 219.

Subscription content provider 201 may be an on-demand media provider providing access to media contents. In one implementation, subscription content provider 201 may be a cable on-demand media provider, an online on-demand media provider, etc. In some implementations, subscription content provider 201 may provide a user with access to subscription content 204 during a subscription period, such as a one-month subscription period, a semi-annual subscription period, an annual subscription period, etc. Subscription content 204 may be similar to the subscription content 104 described above. Subscription content 204 may be content for which a user pays a periodic subscription fee, such as a monthly fee, that enables the user to access subscription content 204. The availability of the various media contents may change occasionally. For example, a first movie may be available to the user through subscription content provider 201 during a first availability period, such as a month. At the end of the first availability period, the first movie may no longer be available for viewing through subscription content provider 201. During a second availability period, a second movie may be available for viewing through subscription content provider 201. In some implementations, availability periods corresponding to one or more media contents may overlap, either partially or completely.

Transactional content provider 205 may be a media content provider providing on-demand access to media contents. In some implementations, transactional content provider 205 may be a cable on-demand media provider, an online on-demand media provider, etc. In some implementations, transactional content provider 205 may provide a user with access to transactional content 208 based on a temporary entitlement or a permanent entitlement. A temporary entitlement may allow the user to access transactional content 208 on a temporary basis, access for a limited time, e.g., a rental, or access for a certain number of impressions. A permanent entitlement may allow the user to access transactional content 208 indefinitely, e.g., when the user purchases transactional content 208. In some implementations, transactional content 208 may include one or more media contents, such as music, audio books, television shows, movies, etc., that are also found in subscription content 204.

Computing device 210 corresponds to computing device 110 and includes subscription entitlements 232 and transactional entitlements 234. Subscription entitlements 232 may include one or more subscription-based entitlements associated with user account 225, and transactional entitlements 234 may include one or more transactional entitlements associated with user account 225. User device 295 may be a device for watching media contents, such as a smart television, a set-top-box, a computer, a tablet computer, etc. In one implementation, computing device 210 may enable a user of user device 295 to view transactional content 208 for which the user does not hold a transactional entitlement through transactional content provider 205 based on a subscription entitlement. In one implementation, computing device 210 may enable a user of user device 295 to view subscription content 204 for which the user does not hold a subscription-based entitlement through subscription content provider 201 based on a transactional entitlement.

A user may sign in to subscription account 202 and/or transactional account 206 using user device 295. In one implementation, transactional content provider 205 may present a selection of media contents included in transactional content 208, including media contents for which user account 225 has an associated temporary or permanent entitlement stored in transactional entitlements 234, and media contents for which user account 225 does not have an associated temporary or permanent entitlement. The user may select a media content to access from the presented selection.

In some implementations, transactional content provider 205 may request a transactional entitlement from computing device 210. Computing device 210 may search transactional entitlements 234 for a transactional entitlement to the selected media content. Computing device 210 may transmit a response indicating that transactional entitlements 234 do not have a transactional entitlement for the requested media content associated with user account 225. In such a situation, computing device 210 may search subscription entitlements 232 for a subscription entitlement to the selected media content. If computing device 210 determines that user account 225 has a subscription-based entitlement to the selected media content stored in subscription entitlements 232, computing device 210 may verify that subscription entitlements 232 includes a subscription-based entitlement associated with user account 225 for the selected media content. In one implementation, in response to receiving the verification that user account 225 includes a subscription-based entitlement for the requested media content, transactional provider 205 may verify with subscription content provider 201 that the requested media content is currently available and is within an availability window.

In one implementation, subscription-based content provider 201 may present a selection of media contents included in subscription content 204, including media contents for which user account 225 has an associated subscription-based entitlement stored in subscription entitlements 232, and media contents for which user account 225 does not have an associated subscription-based entitlement. The user may select a media content to access from the presented selection.

In some implementations, subscription-based content provider 201 may request a subscription-based entitlement from computing device 210. Computing device 210 may search subscription entitlements 232 for a subscription-based entitlement associated with the selected media content. If computing device 210 does not identify a subscription-based entitlement, computing device 210 may transmit a response indicating that subscription entitlements 232 does not have a transactional entitlement for the requested media content associated with user account 225. In such a situation, computing device 210 may search transactional entitlements 234 for a transactional entitlement to the selected media content. If computing device 210 determines that user account 225 has a transactional entitlement associated with the selected media content stored in transactional entitlements 234, computing device 210 may verify that subscription entitlements 232 includes a transactional entitlement associated with user account 225 for the selected media content. After receiving verification that user account 225 has a transactional entitlement for the selected media content, subscription-based content provider 201 may provide access to the selected media content. In one implementation, subscription-based content provider 201 may enable access to a media content that is not currently within an availability window when the access is based on a transactional entitlement.

Figure 3:
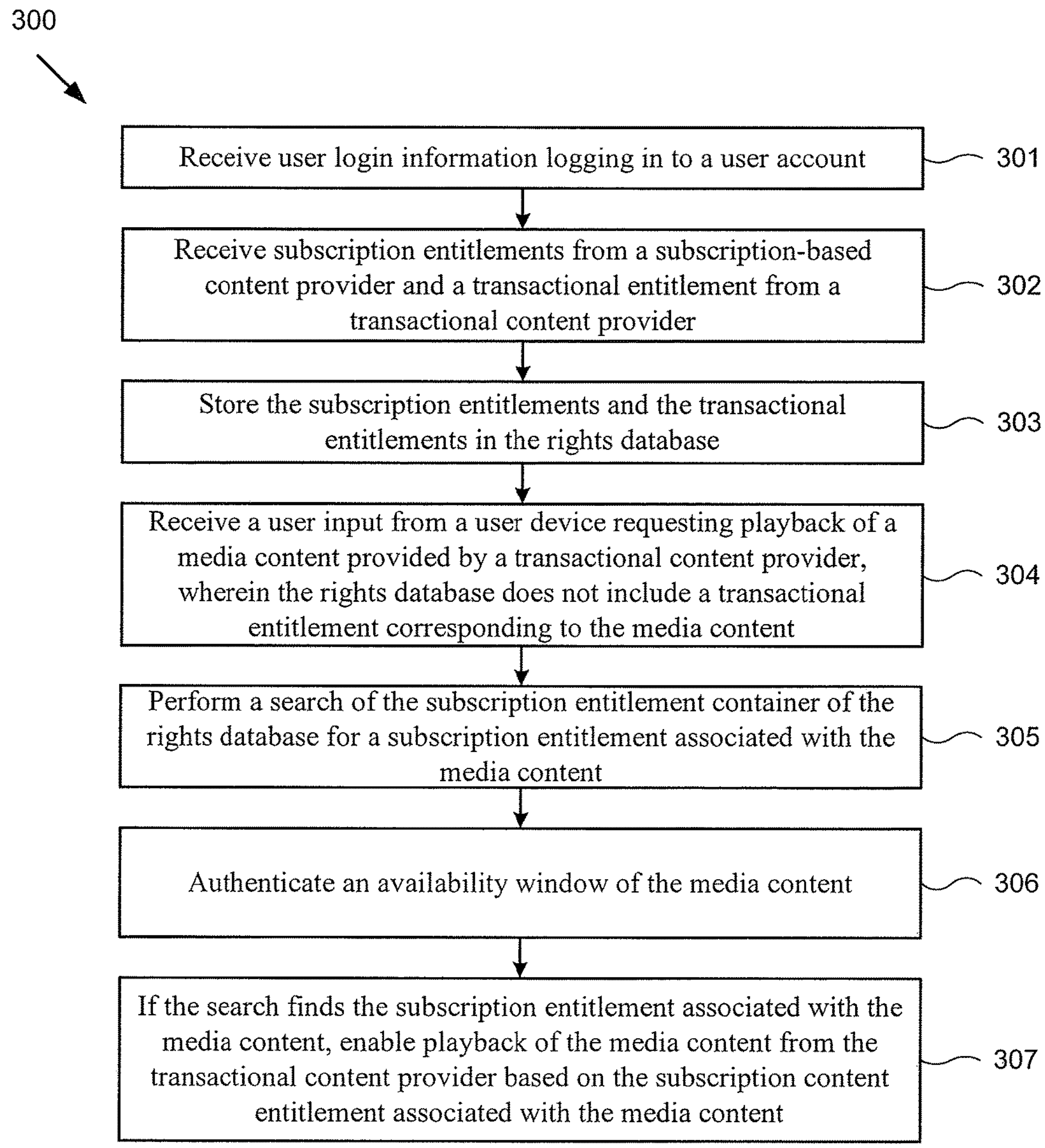
FIG. 3 shows a flowchart illustrating an exemplary method of providing access to media contents using a rights database, according to one implementation of the present disclosure.

FIG. 3 shows a flowchart illustrating an exemplary method of providing access to media contents using a rights database, according to one implementation of the present disclosure. Method 300 begins at 301, where executable code 140 receives user login information from user device 195 logging in to user account 125. User account 125 may include account information for accessing one or more content provider accounts. In some implementations, account access module 141 may use subscription account information 127 to automatically log in to subscription account 102 when the user logs in to user account 125. In some implementations, account access module 141 may use transactional account information 129 to automatically log in to transactional account 106 when the user logs in to user account 125.

At 302, executable code 140 receives subscription entitlements 103 from subscription-based content provider 101 and transactional entitlements 107 from transactional content provider 105. Content entitlement module 143 may receive subscription entitlements 103 from subscription-based content provider 101, and transactional entitlements 107, which may include temporary transactional entitlements, such as rental entitlements, and/or permanent transactional entitlements, such as ownership entitlements, from transactional content provider 105.

Subscription entitlements 103 may include information about subscription content 104, such as a list of media contents that are included in subscription content 104 and an availability window corresponding to each of a plurality of media contents included in subscription content 104. In one implementation, the availability window corresponding to each media content of subscription content 104 may be defined as a period of time measured from a start date, such as a subscription entitlement for three months beginning on January 1, or the availability window corresponding to each media content of subscription content 104 may be defined by an end date, such as a subscription entitlement ending on March 31. In one implementation, subscription content 104 may include a plurality of media contents that may have the same availability window or different availability windows. Transactional entitlements 107 may include content availability terms for temporary transactional entitlements, such as a 72-hour availability term for a rental of transactional content 108.

At 303, executable code 140 stores subscription entitlements 103 and transactional entitlements 107 in rights database 131. In one implementation, subscription entitlements 103 may be stored in subscription entitlement container 132 and transactional entitlements 107 may be stored in transactional entitlement container 134. In some implementations, subscription entitlement container 132 may include a list of a plurality of media contents and a subscription entitlement associated with each media content. Each subscription entitlement may grant a license to the associated media content during an availability window. The media contents to which user account 125 holds subscription entitlements may occasionally change. For example, subscription entitlement container 132 may include a first set of media contents during a first availability window and a second set of media contents during a second availability window. In some implementations, one or more media contents may be included in the first set and the second set. In some implementations, the first availability window may partially or completely overlap with the second availability window.

At 304, executable code 140 receives a user input from user device 195 requesting playback of a media content provided by transactional content provider 105, wherein rights database 131 does not include a transactional entitlement corresponding to the media content. In one implementation, user account 125 may be logged in to transactional account 106, which may present the user with a menu of media contents that are available through transactional content provider 105. The user may select a media content from the menu, such as a movie, television show, computer game, song, audio book, etc., for playback on user device 195. In one implementation, transactional entitlement container 134 may not include a transactional entitlement associated with the media content selected by the user. Method 300 continues at 305, where executable code 140 performs a search of subscription entitlement container 132 of rights database 131 for a subscription entitlement associated with the media content.

At 306, executable code 140 authenticates an availability window of the media content. In one implementation, content availability module 145 may transmit an authentication request to subscription-based content provider 101 for authenticating an availability window of the media content. In response to the authentication request, subscription-based content provider 101 may transmit an authentication signal authenticating the availability window of the media content. In another implementation, subscription-based content provider 101 may update the availability window of the media content using push notifications. Subscription-based content provider 101 may push availability window information to content availability module 145, user account 125, and/or rights database 131. In one implementation, subscription-based content provider 101 may push the availability window of subscription content 104, including an availability widow start and/or an availability window end, to content availability information module 145 using a TTL or time hop mechanism, or other date mechanism. Content availability module 145 may store the availability window information in subscription account information 127 or subscription entitlement container 132, and may use the stored availability window information to authenticate the availability window of the media content.

At 307, if the search of subscription entitlement container 132 finds the subscription entitlement associated with the media content, executable code 140 enables playback of the media content from transactional content provider 105 based on the subscription entitlement associated with the media content. For example, when the user is logged in to transactional account 106, and content entitlement module 143 finds a subscription entitlement for the selected media content in subscription entitlement container 132, executable code 140 may enable playback by transactional content provider 105 of the selected media content based on the subscription entitlement.

Figure 4:
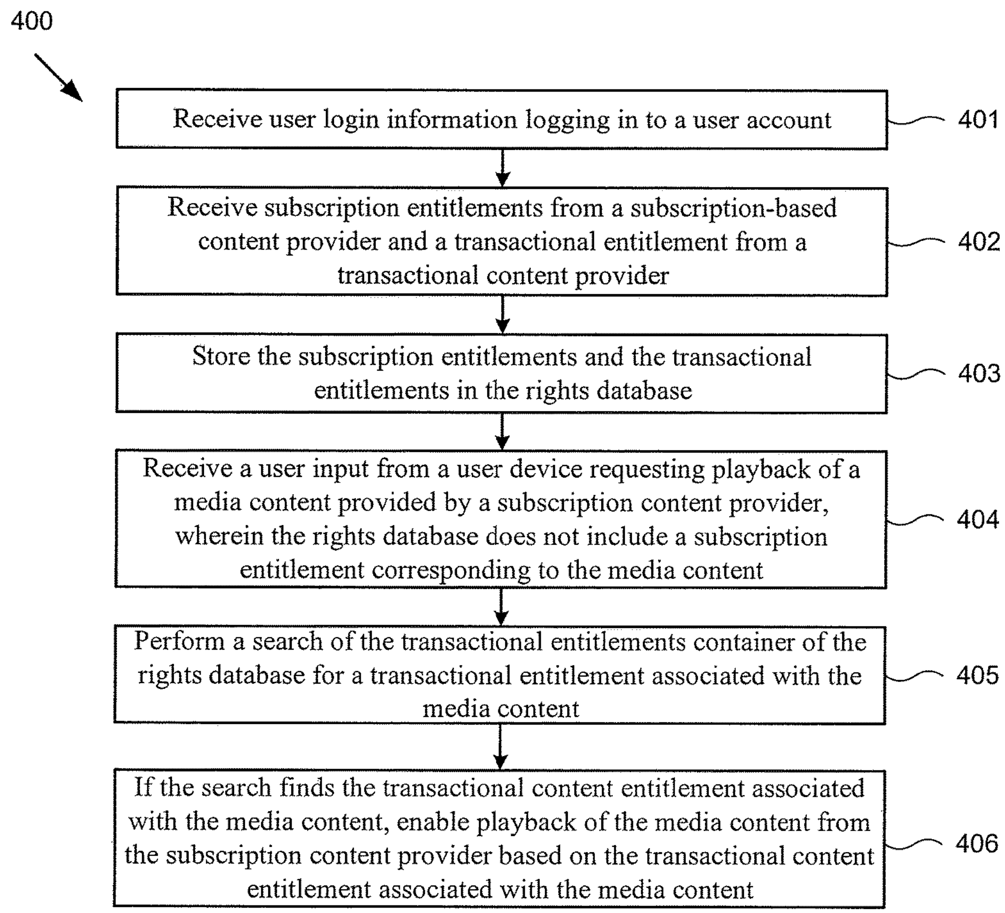
FIG. 4 shows a flowchart illustrating an exemplary method of providing access to media contents using a rights database, according to one implementation of the present disclosure.

FIG. 4 shows a flowchart illustrating an exemplary method of providing access to media contents using a rights database, according to one implementation of the present disclosure. Method 400 begins at 401, where executable code 140 receives user login information from user device 195 logging in to user account 125. User account 125 may include account information for accessing one or more content provider accounts. In some implementations, account access module 141 may use subscription account information 127 to automatically log in to subscription account 102 when the user logs in to user account 125. In some implementations, account access module 141 may use transactional account information 129 to automatically log in to transactional account 106 when the user logs in to user account 125.

At 402, executable code 140 receives subscription entitlements 103 from subscription-based content provider 101 and transactional entitlements 107 from transactional content provider 105. Content entitlement module 143 may receive subscription entitlements 103 from subscription-based content provider 101. Subscription entitlements 103 may include information about subscription content 104, such as a list of media contents that are included in subscription content 104 and an availability window corresponding to each of a plurality of media contents included in subscription content 104. Content entitlement module 143 may receive transactional entitlements 107, which may include temporary transactional entitlements, such as rental entitlements, and/or permanent transactional entitlements, such as ownership entitlements, from transactional content provider 105. Transactional entitlements 107 may include content availability terms for temporary transactional entitlements, such as a 72-hour availability term for a rental of transactional content 108.

At 403, executable code 140 stores subscription entitlements 103 and transactional entitlements 107 in rights database 131. In one implementation, subscription entitlements 103 may be stored in subscription entitlement container 132 and transactional entitlements 107 may be stored in transactional entitlement container 134. In some implementations, subscription entitlement container 132 may include a list of a plurality of media contents and a subscription entitlement associated with each media content. Each subscription entitlement may grant a license to the associated media content during an availability window. The media contents to which user account 125 holds subscription entitlements may occasionally change. For example, subscription entitlement container 132 may include a first set of media contents during a first availability window and a second set of media contents during a second availability window. In some implementations, one or more media contents may be included in the first set and the second set. In some implementations, the first availability window may partially or completely overlap with the second availability window.

At 404, executable code 140 receives a user input from user device 195 requesting playback of a media content provided by subscription content provider 101, where rights database 131 does not include a subscription entitlement corresponding to the media content. In one implementation, user account 125 may be logged in to subscription account 102, which may present the user with a menu of media contents that are available through subscription-based content provider 101. The user may select a media content from the menu, such as a movie, television show, computer game, song, audio book, etc., for playback on user device 195. In one implementation, subscription entitlement container 132 may not include a subscription entitlement associated with the media content selected by the user. Method 400 continues at 405, where executable code 140 performs a search transactional entitlement container 134 of rights database 131 for a transactional entitlement associated with the media content.

At 406, if the search of transaction entitlement container 134 finds the transactional entitlement associated with the media content, executable code 140 enables playback of the media content from subscription-based content provider 101 based on the transactional entitlement associated with the media content. For example, when the user is logged in to subscription account 102, and content entitlement module 143 finds a transactional entitlement to the selected media content in transactional entitlement container 134, executable code 140 may enable playback by subscription-based content provider 101 of the selected media content based on the transactional entitlement.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:

a non-transitory memory storing a rights database including a subscription entitlement container storing one or more subscription entitlements and a transactional entitlement container storing one or more transactional entitlements; and a hardware processor configured to:

receive a user input from a user device requesting playback of a media content provided by a transactional content provider, wherein the rights database does not include a transactional entitlement corresponding to the media content;

perform a search of the subscription entitlement container of the rights database for a subscription entitlement associated with the media content; and if the search finds the subscription entitlement associated with the media content, enable playback of the media content from the transactional content provider based on the subscription content entitlement associated with the media content.

2. The system of claim 1, wherein the transactional entitlement container further includes a temporary-entitlement sub-container and a permanent-entitlement sub-container.

3. The system of claim 1, wherein the media content is one of a video content, an audio content, a game, and an app.

4. The system of claim 1, wherein each subscription entitlement of the one or more subscription entitlements includes an availability window start date and one of an availability window duration and an availability window end date.

5. The system of claim 1, wherein the subscription entitlement container includes one or more profiles for storing profile information of one or more user profiles of an associated user account.

6. The system of claim 1, wherein, prior to enabling playback of the media content from the transactional content provider, the hardware processor further executes the executable code to:

transmit an authentication request to a subscription content provider associated with the subscription entitlement for authenticating an availability window of the media content; and receive an authentication response authenticating the availability window of the media content.

7. The system of claim 1, wherein the rights database includes a list including a plurality of media contents available from each of a plurality of subscription content providers when the user input is received.

8. The system of claim 1, wherein the transactional content provider is one of a cable content provider and an online content provider.

9. A system comprising:

a non-transitory memory storing a rights database including a subscription entitlement container storing one or more subscription entitlements and a transactional entitlement container storing one or more transactional entitlements; and a hardware processor configured to:

receive a user input from a user device requesting playback of a media content provided by a subscription content provider, wherein the rights database does not include a subscription entitlement corresponding to the media content;

perform a search of the transactional entitlements container of the rights database for a transactional entitlement associated with the media content; and if the search finds the transactional content entitlement associated with the media content, enable playback of the media content from the subscription content provider based on the transactional content entitlement associated with the media content.

10. The system of claim 9, wherein the transactional entitlement container further includes a temporary-entitlement sub-container and a permanent-entitlement sub-container.

11. The system of claim 9, wherein the media content is one of a video content, an audio content, a game, and an app.

12. The system of claim 9, wherein the subscription content provider is one of a cable content provider and an online content provider.

13. A method for use with a system including a non-transitory memory storing a rights database, and a hardware processor, the method comprising:

receiving, using the hardware processor, a user input from a user device requesting playback of a media content provided by a transactional content provider, wherein the rights database does not include a transactional entitlement corresponding to the media content;

performing, using the hardware processor, a search of a subscription entitlement container of the rights database for a subscription entitlement associated with the media content; and if the search finds the subscription content entitlement associated with the media content, enabling, using the hardware processor, playback of the media content from the transactional content provider based on the subscription content entitlement associated with the media content.

14. The method of claim 13, wherein a transactional entitlement container of the rights database includes a temporary-entitlement sub-container and a permanent-entitlement sub-container.

15. The method of claim 13, wherein the media content is one of a video content, an audio content, a game, and an app.

16. The method of claim 13, wherein the subscription entitlement associated with the media content includes an availability start date and one of an availability window duration and an availability window end date.

17. The method of claim 13, wherein the subscription entitlement container includes one or more profiles for storing profile information of one or more user profiles of an associated user account.

18. The method of claim 13, wherein, prior to enabling playback of the media content, the method further comprises:

transmitting, using the hardware processor, an authentication request to a subscription content provider associated with the subscription entitlement for authenticating an availability window of the media content; and receiving, using the hardware processor, an authentication response authenticating the availability window of the media content.

19. The method of claim 13, wherein the rights database includes a list including a plurality of media contents available from each of a plurality of subscription content providers when the user input is received.

20. The method of claim 13, wherein the transactional content provider is one of a cable content provider and an online content provider.

* * * * *